Sept. 17, 1946. C. H. BUCHANAN 2,407,867
METHOD OF PRODUCING CURVED "SANDWICH" MATERIAL
Filed March 15, 1940
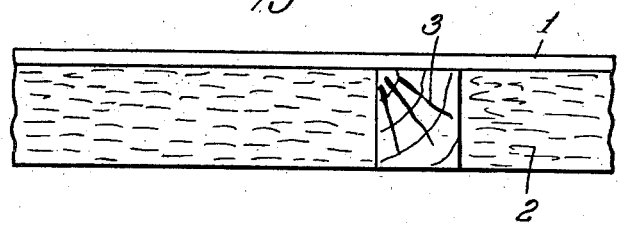
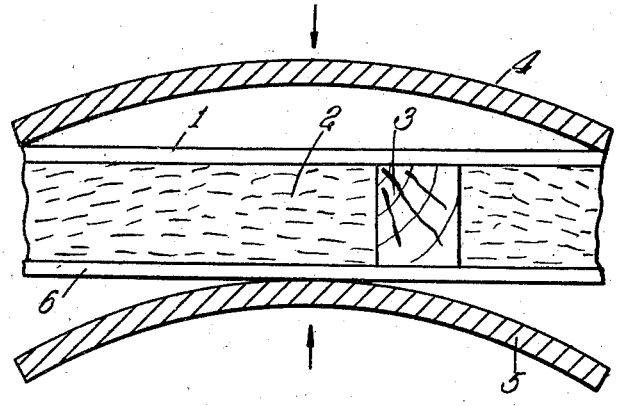
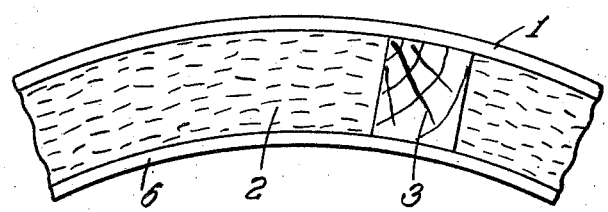
INVENTOR:
CHARLES HENRY BUCHANAN
BY Haseltine, Lake & Co.
ATTORNEYS Patented Sept. 17, 1946

2,407,867

UNITED STATES PATENT OFFICE 2,407,867

METHOD OF PRODUCING CURVED "SANDWICH" MATERIAL

Charles Henry Buchanan, Kingston-on-Thames, England, assignor to Jicwood Limited, Weybridge, England, a British company Application March 15, 1940, Serial No. 324,047
In Great Britain February 9, 1940

2 Claims. (Cl. 154—110)

This invention relates to the production of "sandwich" material curved in one or more planes, such material consisting of a core of more or less soft material sandwiched between two facing sheets of more or less hard material adhesively united or bonded to the core. The core is usually rather thick while rather thin material is used for the facing sheets, the skins serving to protect the relatively soft core, the material having great rigidity particularly when curved while being definitely light in weight. Such material is extensively used in the construction of aircraft, in marine super-structures and in coach building and due to its inherent rigidity by virtue of its construction can be successfully used, without supporting frames, formers, stringers or like members, such a construction being generally known in the aircraft industry as "monocoque" construction. The facing sheets may be of similar or different materials and may be plywood, light sheet metal, alloys or synthetic plastic sheets or a combination of such materials having a high density and a high modulus of elasticity comparable with the core, the latter consisting of a light cellular material, for example, expanded rubber product having a low density and an almost negligible modulus of elasticity. Such material has hitherto been produced by means of a moulding process, the adhesively united skins and core being moulded together to the required curvature, but the degree of curvature obtainable by such a method is limited due to the excessive tension stresses set up in the skin, having the greater radius of curvature, hereinafter referred to as the outer skin, and the reciprocal compressive stresses set up in the facing sheet, having the smaller radius of curvature, hereinafter referred to as the inner facing sheet. Furthermore, there was considerable likelihood of the core collapsing during the moulding operation resulting in a material of non-uniform thickness, quite unsuitable for the purpose for which it was intended.

The chief object of the invention is to evolve a method of producing curved sandwich material which will not subject the facing sheets and core to such stresses and will enable material to be produced having a pronounced degree of curvature, i. e. having a curvature considerably in excess of that previously obtained. In such a case, the degree of curvature obtainable is only restricted by the thickness of the core.

Although it is within the scope of the invention to preform, that is to say, to bend the remaining or inner facing sheet to the required curvature before its application, this is not generally necessary, and after the adjacent surfaces of the core and inner facing sheet have been coated with synthetic resin adhesive, the inner facing sheet may be applied when in its original flat state and forced to assume the required degree of curvature, the inner facing sheet being maintained in its curved condition during setting of the adhesive.

With this process the core is not subjected to any stresses which would tend to cause it to collapse either during the bending operation or subsequently and consequently such curved sandwich material is of uniform thickness in cross section and does not tend to flatten out during use.

Referring to the drawing:

Figure 1 is a cross section showing the outer facing sheet (the facing sheet to have the greater radius of curvature) adhesively secured while in a flat condition to the core.

Figure 2 illustrates the material shown in Figure 1 as being bent together with the remaining facing sheet to the required curvature in a jig or other suitable moulding machine.

Figure 3 is a cross section of the completed curved sandwich material, after removal from the jig.

In Figure 1 the outer facing sheet 1, that is to say, the facing sheet which is to have the greater radius of curvature has been adhesively secured or loaded in position upon the core 2 by means of a suitable press, both members being in a flat or substantially flat condition. Any suitable adhesive may be used to suit the material used for the construction of the core and outer facing sheet, but it is preferred to employ a thermo-hardening resin for this purpose, the outer facing sheet and core being adhesively united together within a suitable press under light pressure at a temperature sufficient to set the resin. In Figure 1 there is shown a spruce or other spacing member 3 embedded in the core which serves to receive a securing bolt or other fastening device for maintaining the sandwich material in position on the structure to which it is to be applied.

In Figure 2 the flat composite material shown in Figure 1 has been placed between the co-operating members 4 and 5 of a simple jig, together with the inner facing sheet 6, and is in the process of being bent to the required degree of curvature, the inner surface of the core and/or adjacent surface of the facing sheet 6 having been coated with the resin adhesive, pressure being applied to the parts 4 and 5 of the jig in the direction of the arrows. The application of pressure to the parts 4 and 5 causes the outer surface of the outer facing sheet 1 to be pressed firmly into contact with the inner surface of the part 4 of the jig and the inner surface of the core 2 to contract or to compress without affecting the uniform thickness of the core. At the same time, the flat inner facing sheet 6 is forced to assume the curved contour of the inner surface of the core and is pressed into intimate contact therewith. After the synthetic resin adhesive uniting the inner facing sheet to the inner surface of the core has set, the sandwich material is removed from the mould. By adhesively uniting or bonding the outer facing sheet with the core prior to bending, any possibility of the outer surface of the core collapsing due to tension stresses set up in the bending operation is avoided, as such stresses are taken by the outer skin.

Any suitable adhesive may be used to unite the inner surface sheet and core together, but it is preferred to employ a thermo-hardening resin for this purpose, as already stated, a very good and durable bond being obtained thereby.

What I claim and desire to secure by Letters Patent of the United States is:

1. A method of producing curved composite material suitable for aircraft fuselages and other structural parts intended to withstand very heavy dynamic loads and to have a permanent set of at least one finished bend consisting in the use of a core of expanded rubber and relatively thin flexible outer layers of relatively harder material such as e. g. plywood or metal, and in first uniting one of the said outer layers to the core by means of a thermo-hardening resin and heat and pressure so as to set the resin, applying a layer of the thermo-hardening resin between the other thin layer and the hitherto non-covered side of the core, and bending the resultant laminae to the required curvature between press members shaped to conform with the required finished curvature and with the second applied layer on the smaller radius of the curve, and when the latter applied thermo-hardening resin has set releasing the pressure from the work and removing the work from the press.

2. A method of producing curved composite material consisting in the use of a core of thick, soft non-fibrous though rigid material of a cellular nature and of low density and two outer thin flexible layers of hard material having a much higher density than the core material to produce a laminated product the inner or core layer of which has a greater thickness than the total thickness of the outer layers, uniting the outer layer which is intended to have the greater radius of curvature in completely set condition to the core while in a substantially flat condition by the use of a thermo-hardening resin and heat and pressure, superimposing the inner layer upon the hitherto non-covered side of the core with the inter-position of a layer of thermo-hardening resin, bending the initially formed composite and the inner layer together to the required curvature in a press before the adhesive interposed between the initially formed composite material and the inner layer has set, and subsequently removing the completed curved composite material from the press when the adhesive uniting the inner layer to the initially formed composite has set, the thermo-hardening resin employed being one capable of setting by cooling at substantially normal atmospheric temperature, and without the application of great pressure, the pressure used in the press being sufficient only to bend the material and maintain the layers in effective contact during the bending and setting process.

CHARLES HENRY BUCHANAN.